Patented Oct. 23, 1928.

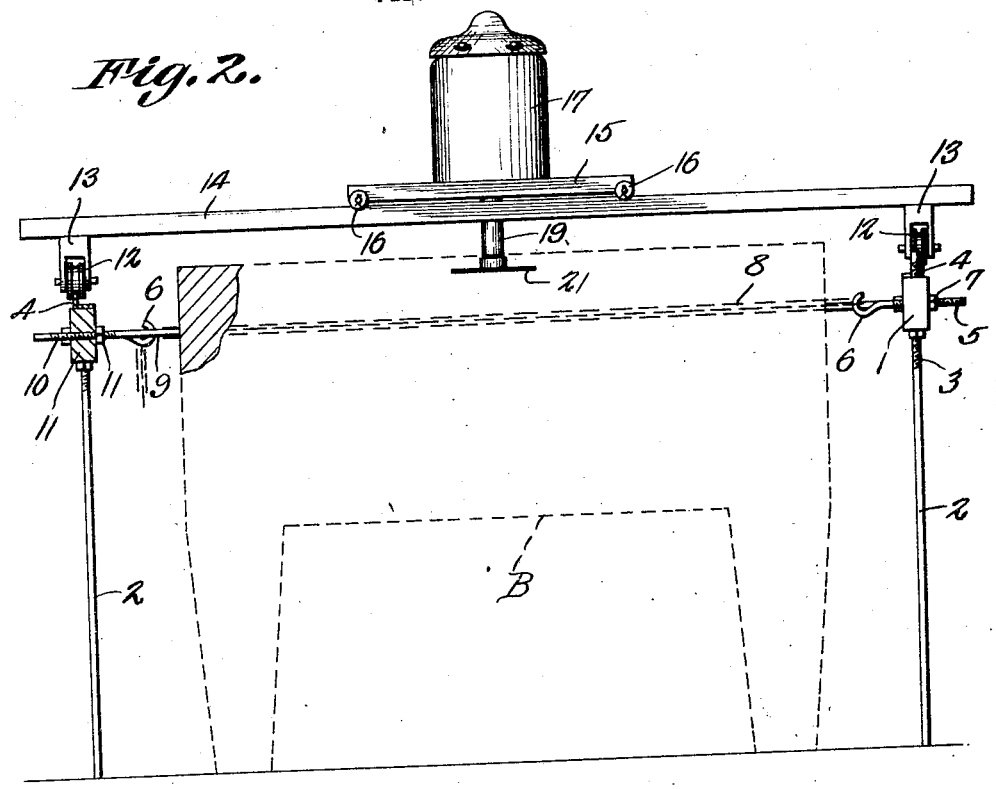
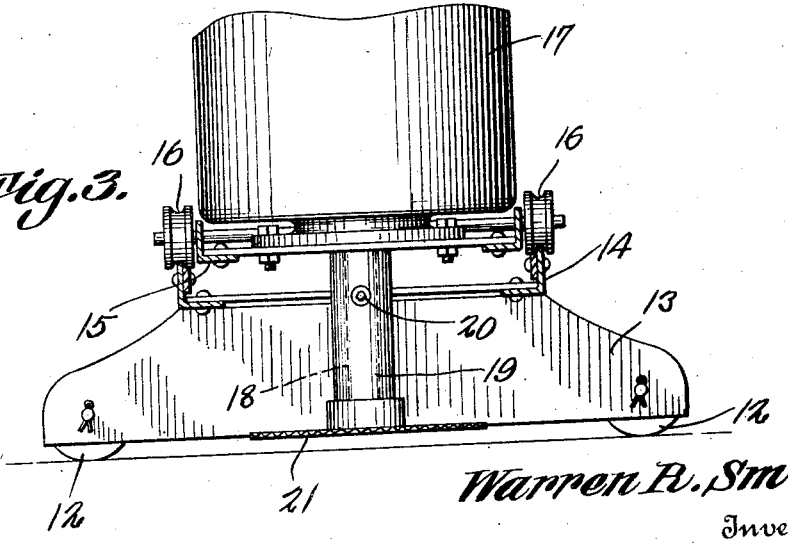

1,688,439

UNITED STATES PATENT OFFICE.

WARREN R. SMOUT, OF ALBANY, WISCONSIN.

SURFACE TRIMMER FOR MEAT BLOCKS.

Application filed December 11, 1926. Serial No. 154,243.

This invention relates to a portable device for trimming or smoothing the surfaces of meat blocks, one of the objects being to provide a simple and compact structure which can be set up readily for use and has means whereby it can be assembled fixedly with a meat block to enable the cutting element to travel along a predetermined path, thereby to smooth or re-surface the block.

A further object is to provide a light and durable structure which eliminates gears and other objectionable mechanisms for actuating the carriage and the cutter suspended therefrom.

A still further object is to provide mechanism of this character which can be transported readily.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 2 is a side elevation of the mechanism, the position of the meat block being indicated by broken lines.

Figure 3 is an enlarged vertical transverse section through the travelling track and one end portion of the carriage, said section being taken on the line 3—3, Figure 1.

Figure 1:
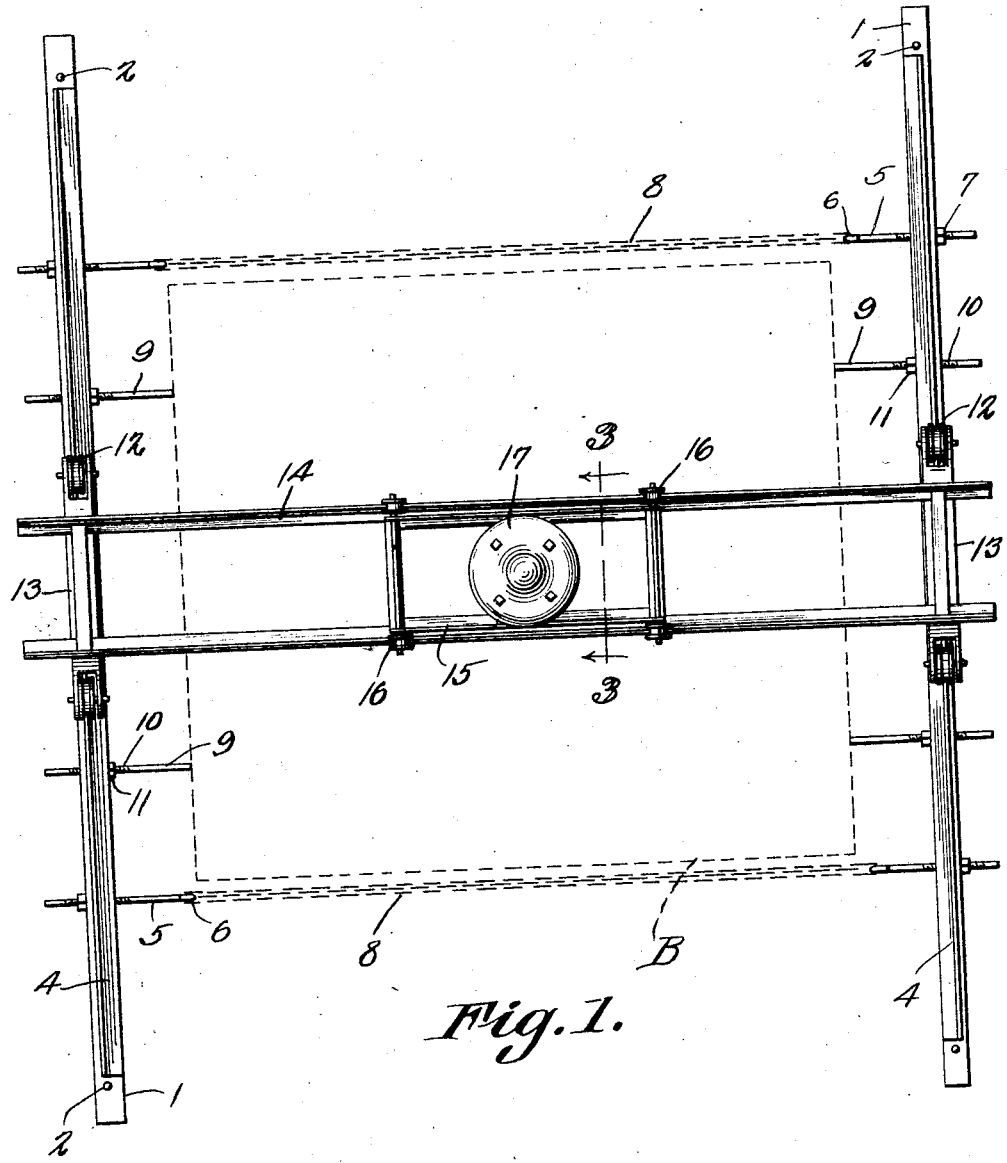
Figure 1 is a plan view of the machine, the position of a meat block relative thereto being indicated by broken lines.

Referring to the figures by characters of reference 1 designates side strips preferably formed of wood provided adjacent their ends with supporting standards 2 the upper end of which can be screw threaded as at 3 for adjustable engagement with the side strips 1, thus to support said strips at desired elevations. Secured on each of the side strips 1 is an angle strip 4 extending longitudinally thereof and constituting a rail. Adjustably mounted within and extending through each of the side strips 1 adjacent its ends are threaded stems 5 provided at their inner ends with hooks 6. These stems are engaged by nuts 7 whereby they can be held adjustably to the side strips although it is to be understood that any other desired means may be employed for this purpose. The corresponding hooks connected to the two side strips are disposed directly opposite each other and are adapted to engage chains 8 or the like. Gripping fingers 9 in the form of rods are extended transversely through the side strips 1 at points between the stems 5 and are provided with threaded portions 10 engaged by nuts 11 or the like bearing against the inner sides of the strips 1.

After the strips 1 have been adjusted to the desired elevation so as to be supported by the standards 2, the chains 8 are connected to the hooks 6 so as to extend close to opposed faces of a meat block B. The fingers 9 are then adjusted toward each other by means of the nuts 11 so that their inner ends will bear against and tightly grip opposed faces of the block B thereby holding the strips 1 fixed relative to the block.

The two angle rails 4 constitute supports for the grooved wheels 12 journaled in the ends of heads 13. Connecting these heads is a track 14 made up of parallel opposed angle strips and it will be apparent that this track, which is fixed relative to the heads 13, can thus be moved longitudinally of the rails 4 so as to be positioned at any desired point above the block B.

Mounted to travel on the track 14 is a carriage 15 having grooved wheels 16 engaging the rails of the track 14. This carriage is provided with an upstanding housing 17 at the center thereof in which is located an electric motor, not shown, the shaft of the motor being extended downwardly below the center of the carriage as shown at 18 and provided with a sleeve 19 fixedly attached thereto in any desired manner, as by means of a set screw 20. This sleeve extends upwardly from the center of a circular saw 21. The upper and lower faces of which are parallel with the path of movement of the carriage.

After the rails 4 have been adjusted to a desired elevation relative to the top of the block B so that the upper surface of the block can be trimmed properly, the track 14 is brought to position over one side portion of the block with the carriage 15 at one end of the track 14. The electric motor is then actuated after which the carriage 15 is pushed along track 14 to bring the rotating saw 21 against the upper portion of the block. The saw will cut across the block below the top surface thereof, the severed work breaking away so as to clear a path for the sleeve 19 and shaft 18. Track 14 is then shifted laterally a short distance and the saw 21 is started back across the block again. This movement is continued until the entire upper portion of the block has been trimmed so as to produce a smooth surface. It will be noted that, by reason of the firm connection of the apparatus with the block, there is no danger of the parts becoming displaced during the trimming operation. Furthermore as the carriage is operated by hand, it can be fed at any speed desired to produce the best results. After the block has been properly trimmed or re-surfaced, the apparatus can be quickly removed simply by lifting the carriage 15 from the track 14, removing the track from the rail 4, loosening the stems 5, and then detaching chains from the hooks 6.

By providing the several gripping fingers 9 along the strips 1, opposed sides of the block can be properly gripped even though they should be extremely rough and uneven. Furthermore the strips 1 are connected by the detachable flexible members 8 which thus allow said strips to be placed together and stored readily with the removed track 14 lying parallel therewith. Consequently when the structure is not in use it can be conveniently stored because of its collapsible nature.

What is claimed is:

A machine of the class described including parallel side strips, separately adjustable fingers extending laterally therefrom for engagement with a side of a block to be trimmed, flexible, detachable and adjustable connections between the end portions of the side strips, a track including wheel supported heads detachably mounted and movable longitudinally of the respective side strips and rails connecting the heads, a carriage removably mounted on and movable longitudinally of the track, and a motor driven cutting element movable with the carriage.

In testimony that I claim the foregoing as my own, I have hereto affixed my signature.

WARREN R. SMOUT.